United States Patent
Zhang et al.

(10) Patent No.: US 12,488,601 B2
(45) Date of Patent: Dec. 2, 2025

(54) DROWSY DRIVING DETECTION METHOD AND SYSTEM THEREOF, AND COMPUTER DEVICE

(71) Applicant: GUANGZHOU AUTOMOBILE GROUP CO., LTD., Guangdong (CN)

(72) Inventors: Ying Zhang, Guangdong (CN); Tianlai Wu, Guangdong (CN); Jichen Cai, Guangdong (CN); Dongjian He, Guangdong (CN); Jinzhou Sha, Guangdong (CN); Chao Chen, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 331 days.

(21) Appl. No.: 17/924,555

(22) PCT Filed: Jun. 1, 2021

(86) PCT No.: PCT/CN2021/097618
§ 371 (c)(1),
(2) Date: Nov. 10, 2022

(87) PCT Pub. No.: WO2021/249239
PCT Pub. Date: Dec. 16, 2021

(65) Prior Publication Data
US 2023/0230397 A1    Jul. 20, 2023

(30) Foreign Application Priority Data
Jun. 12, 2020   (CN) .................. 202010535115.6

(51) Int. Cl.
*G06V 20/59*    (2022.01)
*B60W 40/09*    (2012.01)
(Continued)

(52) U.S. Cl.
CPC .......... *G06V 20/597* (2022.01); *B60W 40/09* (2013.01); *G06V 40/168* (2022.01); *G06V 40/18* (2022.01);
(Continued)

(58) Field of Classification Search
CPC .... G06V 20/59; G06V 20/593; G06V 20/597; G06V 40/16; G06V 40/168;
(Continued)

(56) References Cited

U.S. PATENT DOCUMENTS

2005/0226472 A1* 10/2005 Komura ............... G06V 40/161
                                                                  382/118
2006/0202843 A1*  9/2006 Ota ....................... G06V 10/145
                                                                  340/576
(Continued)

FOREIGN PATENT DOCUMENTS

CN        103198616 A        7/2013
CN        104298963 A        1/2015
(Continued)

OTHER PUBLICATIONS

Rusmin PH, Osmond AB, Syaichu-Rohman A. Design and implementation of driver drowsiness detection system on digitalized driver system. In2013 IEEE 3rd International Conference on System Engineering and Technology Aug. 19, 2013 (pp. 375-380). IEEE (Year: 2013).*

(Continued)

*Primary Examiner* — Oneal R Mistry
*Assistant Examiner* — Duy Tran
(74) *Attorney, Agent, or Firm* — Hodgson Russ LLP

(57) ABSTRACT

A drowsy driving detection method comprises: acquiring a side face image of a currently seated driver collected by a camera module; performing face recognition on the side face image to obtain side face feature parameters, and determin-
(Continued)

ing, according to the side face feature parameters, whether an ID file corresponding to the currently seated driver exists in a driver ID library; and if yes, periodically acquiring a side face image of the driver in the current period collected by the camera module, obtaining eye movement feature parameters of the driver in the current period according to the side face image of the current period, and determining whether the driver is driving while drowsy according to a comparison result between the eye movement feature parameters of the current period and the normal eye movement feature parameters of the driver.

15 Claims, 7 Drawing Sheets

(51) Int. Cl.
  *G06V 40/16* (2022.01)
  *G06V 40/18* (2022.01)
  *H04N 23/56* (2023.01)
(52) U.S. Cl.
  CPC ....... *H04N 23/56* (2023.01); *B60W 2540/043* (2020.02); *B60W 2540/229* (2020.02)
(58) Field of Classification Search
  CPC .. G06V 40/171; G06V 40/174; G06V 40/179; G06V 40/18; G06V 40/10; H04N 23/45; H04N 23/56; H04N 23/60; B60W 2040/0809; B60W 40/09; B60W 2040/0827; B60W 2540/043; B60W 2540/225; B60W 2540/22; B60W 2540/229; B60W 2050/0043; B60W 50/12
  See application file for complete search history.

(56) References Cited

U.S. PATENT DOCUMENTS

| | | | |
|---|---|---|---|
| 2013/0010096 A1 | 1/2013 | S et al. | |
| 2013/0050462 A1* | 2/2013 | Watanabe | B60R 21/01552 348/E7.085 |
| 2016/0001781 A1* | 1/2016 | Fung | G07C 9/37 701/36 |
| 2017/0080947 A1* | 3/2017 | Boos | A61B 5/18 |
| 2017/0353642 A1* | 12/2017 | Yoon | G06V 40/174 |
| 2017/0355377 A1 | 12/2017 | Kumar et al. | |
| 2019/0028629 A1* | 1/2019 | Yoon | H04N 23/67 |
| 2019/0202352 A1 | 7/2019 | Liao | |
| 2019/0370579 A1* | 12/2019 | Sugawara | G06V 40/19 |

FOREIGN PATENT DOCUMENTS

| | | |
|---|---|---|
| CN | 107241535 A | 10/2017 |
| CN | 108446600 A | 8/2018 |
| CN | 108791299 A | 11/2018 |
| CN | 109367479 A | 2/2019 |
| CN | 110115796 A | 8/2019 |
| CN | 212569804 U | 2/2021 |

OTHER PUBLICATIONS

Zhitao Xiao, et al., "Fatigue driving recognition network fatigue driving recognition via convolutional neural network and long short-term memory units", Research Article, The Institution of Engineering and Technology, vol. 13, Issue No. 9, Jun. 6, 2019.

Min Liu, "Research on Fatigue Driving Detection Techniques Based on Head Features and Posture Estimation", Master's Thesis, School of Computer Science and Technology Donghua University, Mar. 15, 2020.

China Patent Office, Office action issued on Jan. 29, 2024.

* cited by examiner

DROWSY DRIVING DETECTION METHOD AND SYSTEM THEREOF, AND COMPUTER DEVICE

CROSS-REFERENCE TO RELATED APPLICATIONS

This application is a 371 of International Application No. PCT/CN2021/097618, filed Jun. 1, 2021, which is based upon and claims priority to Chinese Patent Application No. 202010535115.6, titled "DROWSY DRIVING DETECTION METHOD AND SYSTEM THEREOF, COMPUTER DEVICE, AND STORAGE MEDIUM", which was filed at the State Intellectual Property Office of the People's Republic of China on Jun. 12, 2020, the entire contents of which are referred and incorporated herein.

TECHNICAL FIELD

The present application relates to the technical field of driver's drowsiness detection, and more particularly, to a drowsy driving detection method and a system thereof, a computer device and a storage medium.

BACKGROUND

With the development of society, the advancement of science and technology and the improvement of people's living standards, vehicles are used more and more frequently in modern society, and transportation safety has become a serious social problem that cannot be ignored in people's daily life, while a considerable number of people are killed and injured in traffic accidents every year. Statistical analysis of traffic accidents shows that, a vast majority of traffic accidents are caused by human factors, and most of the human factors are caused by drowsy driving, such as decreased vision, distraction, and decreased thinking ability caused by driver's drowsiness in the process of driving the vehicle, resulting in unresponsiveness, failing to judge in time, slow action and other problems. The above problems can be analyzed and judged from the driver's brain or human eye state, so as to remind the driver's current drowsiness state in time, thereby reducing the potential hazards of driver's drowsiness.

At present, there are corresponding drowsy driving detection technologies at home and abroad. Most of them determine whether the driver is drowsily driving by detecting a state of opening and closing of the driver's eyes. For example, the state of opening and closing of the driver's eyes is detected by acquiring a frontal face image of the driver, performing a face recognition on the frontal face image of the driver, and extracting blink frequency, facial expression and other behavioral features of the driver.

In the process of achieving the present disclosure, the inventor found that the above-mentioned drowsy driving detection technology has at least the following technical problems.

There are individual differences in drivers. For example, some drivers wear myopia glasses. While wearing myopia glasses, when there is light shining on the face, the driver's glasses lens will receive the light to form a light spot, and the eye features cannot be correctly extracted on the captured driver's face image. Therefore, the accuracy of drowsiness identification results is not high due to interference. Another example is a driver with special conditions, such as a driver with low myopia but in a squinting state, or a driver with eye defects. A same set of detection models cannot be applied to all drivers, and it need to be detected by a unified standard recognition algorithm. While dealing with the drowsy driving detection of these drivers with special conditions, the system will consume a large amount of computing resources, the detection and recognition efficiency is slow, and the recognition accuracy does not meet the ideal standard.

SUMMARY

There are provided a drowsy driving detection method and a system thereof, a computer device, and a computer-readable storage medium according to embodiments of the present disclosure. The technical solution is as below:

According to a first aspect of embodiments of the present disclosure, there is provided a drowsy driving detection method, comprising:

acquiring a side face image of a driver currently seated captured by a camera module;

performing a face recognition on the side face image to obtain a side face feature parameter, and determining whether there is an ID file corresponding to the driver currently seated in a driver ID library according to the side face feature parameter, wherein the ID file comprises a side face feature parameter of the driver and a normal eye movement feature parameter of the driver in an awake state; and periodically acquiring side face images of the driver in a current period captured by the camera module during a driving process, obtaining an eye movement feature parameter of the driver in the current period according to the side face images of the driver in the current period, and determining whether the driver is drowsily driving according to a comparison result between the eye movement feature parameter in the current period and the normal eye movement feature parameter of the driver, if there is an ID file corresponding to the driver currently seated in the driver ID library.

According to a second aspect of embodiments of the present disclosure, there is provided a drowsy driving detection system, comprising:

a processor; and a memory for storing computer-readable instructions executable by the processor;

and the processor is configured to perform a drowsy driving detection method, the method comprising:

acquiring a side face image of a driver currently seated captured by a camera module;

performing a face recognition on the side face image to obtain a side face feature parameter, and determining whether there is an ID file corresponding to the driver currently seated in a driver ID library according to the side face feature parameter, wherein the ID file comprises a side face feature parameter of the driver and a normal eye movement feature parameter of the driver in an awake state; and periodically acquiring side face images of the driver in a current period captured by the camera module during a driving process, obtaining an eye movement feature parameter of the driver in the current period according to the side face images of the driver in the current period, and determining whether the driver is drowsily driving according to a comparison result between the eye movement feature parameter in the current period and the normal eye movement feature parameter of the driver, if there is an ID file corresponding to the driver currently seated in the driver ID library.

According to a third aspect of embodiments of the present disclosure, there is provided a computer device, comprising: a memory and a processor, wherein computer-readable instructions are stored in the memory, and when the computer-readable instructions are executed by the processor, the processor executes steps of the drowsy driving detection method according to the first aspect of embodiments.

BRIEF DESCRIPTION OF THE DRAWINGS

In order to illustrate technical solutions of embodiments of the present application or technical solutions of the prior art more clearly, the drawings that are used in the description of the embodiments of the present application or the prior art will be introduced briefly as follows. Obviously, the drawings in the following description are only some embodiments of the present application, for those of ordinary skill in the art, other drawings may also be obtained from these drawings without creative labor.

DETAILED DESCRIPTION

Figure 1:
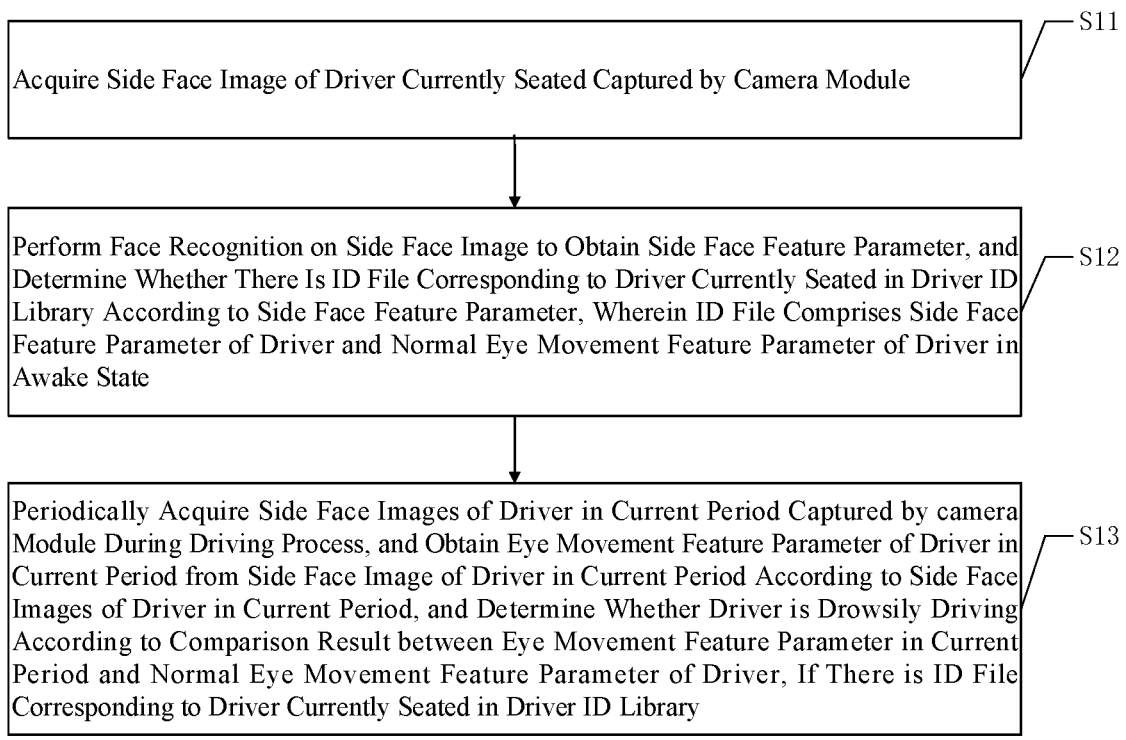
FIG. 1 illustrates a flowchart of a drowsy driving detection method according to an embodiment of the present disclosure.

Various exemplary embodiments, features and aspects of the present disclosure will be described in detail below with reference to the accompanying drawings. The same reference numbers in the figures denote elements with the same or similar functions. Although various aspects of the embodiments are shown in the drawings, the drawings are not necessarily drawn to scale unless otherwise indicated.

In addition, in order to better illustrate the present disclosure, numerous specific details are given in the following specific embodiments. It should be understood by those skilled in the art that the present disclosure may be practiced without certain specific details. In some embodiments, means well known to those skilled in the art have not been described in detail in order to highlight the subject matter of the present disclosure.

An embodiment of the present disclosure proposes a drowsy driving detection method. Referring to FIG. 1, FIG. 1 is a flowchart of a drowsy driving detection method according to the embodiment, and the method includes steps S11-S13.

Step S11, a side face image of a driver currently seated captured by the camera module is acquired.

Specifically, the side face image refers to a left side face image or a right side face image of the driver. Different countries/regions may adopt different driving rules. For example, China adopts a driving rule of keeping to the right, and for another example, the UK adopts a driving rule of keeping to the left. While adopting the driving rule of keeping to the right, the driver sits on a front left seat. In this circumstance, in order to facilitate a mounting of the camera module and a capture of side face images, the camera module may be arranged at a position close to the front left seat, and captures the left side face image of the driver. While adopting the driving rule of keeping to the left, the driver sits on a front right seat. In this circumstance, in order to facilitate a mounting of the camera module and a capture of side face images, the camera module may be arranged at a position close to the front right seat, and captures the right side face image of the driver.

It can be understood that, compared to other technologies that use a camera arranged directly in front of the driver to capture frontal images of the driver, in this embodiment, the camera captures side face images of the driver, which will not be affected by the light spots formed by the glasses lens when the driver wears glasses.

Step S12, a face recognition is performed on the side face image to obtain a side face feature parameter, and whether there is an ID file corresponding to the driver currently seated in a driver ID library is determined according to the side face feature parameter. The ID file includes the side face feature parameter of the driver and a normal eye movement feature parameter of the driver in an awake state.

Specifically, in this embodiment, different ID files are established to correspond to different drivers. The driver ID library stores a plurality of driver ID files, and the ID files include the side face feature parameter of the driver and the normal eye movement feature parameter of the driver in the awake state, that is to say, for different drivers, the normal eye movement feature parameter as a comparison reference are different.

In step S12, the side face feature parameter of the driver currently seated obtained by the face recognition are compared one by one with the side face feature parameter of the driver in the plurality of ID files in the driver ID library, so as to determine whether there is an ID file corresponding to the driver currently seated in the driver ID library. The side face feature parameter refers to feature parameters of the side face as a whole.

The normal eye movement feature parameter is just exemplary, and not limited to, at least one of a distance parameter between the upper and lower eyelids when the eyes are opened normally, a normal blink time parameter, and a percentage of eyelid closure over the pupil over time (Per-clos). Of course, the eye movement feature may also be other features related to eyes, which is not specifically limited in this embodiment.

Step S13, if there is an ID file corresponding to the driver currently seated in the driver ID library, during a driving process, side face images of the driver in a current period captured by the camera module are periodically acquired. An eye movement feature parameter of the driver in the current period is obtained according to the side face images in the current period, and whether the driver is drowsily driving is determined according to a comparison result between the eye movement feature parameter in the current period and the normal eye movement feature parameter of the driver.

Specifically, when it is determined in step S12 that there is an ID file corresponding to the driver currently seated in the driver ID library, the normal eye movement feature parameter of the driver in the corresponding ID file is obtained, which is used as a reference parameter for determining whether the driver is drowsily driving.

Specifically, during the driving process of the vehicle, the side face images of the driver in the current period captured by the camera module are periodically obtained, and the corresponding eye movement feature parameter in the current period is further obtained. The time of the period herein may be freely set. Finally, the eye movement feature parameter in the current period is compared to the normal eye movement feature parameter of the driver. If the eye movement feature parameter in the current period is not within a range of the normal eye movement feature parameter of the driver, it is determined that the driver is drowsily driving. Otherwise, it is determined that the driver is not drowsily driving. When the drowsy driving is detected, the in-vehicle assistant responds to a wake-up warning and an automatic driving intervenes.

It should be noted that an image feature extraction is a widely used technical means in the field of image recognition. A principle of image feature extraction is essentially to determine a detection target by using different pixel values of pixels on an image. In this embodiment, the detection target is the eyes. Therefore, based on the side face images captured in this embodiment, those skilled in the art are familiar with how to extract eye movement features. Therefore, specific steps of eye movement feature extraction are not limited in this embodiment, and this embodiment may be applied in combination with any technical means of eye movement feature extraction, and it should be understood that they all fall within the protection scope of this embodiment.

It should also be noted that a main idea of this embodiment is to use the side face image of the driver as a judgment basis for drowsy driving detection. Whether it is a side face image or a frontal face image, the extracted feature data are all eye movement features. The technical means of drowsy driving detection based on eye movement features are widely used in the field of drowsy driving detection. Therefore, based on the eye movement feature parameter extracted in this embodiment, those skilled in the art are familiar with how to perform the drowsy driving detection. Therefore, specific steps of drowsy driving detection are not limited in this embodiment, and this embodiment may be applied in combination with any technical means for drowsy driving detection based on eye movement features, such as the Percentage of Eyelid Closure over the Pupil Over Time (PERCLOS) algorithm. The PERCLOS algorithm also includes the technical means of feature extraction, and it should be understood that they are all within the protection scope of this embodiment.

Based on the description of the above embodiment, it can be seen that in this embodiment, the side face images of the driver are used as the judgment data for detecting the driver drowsy driving. Since the side face images captured by the camera module are not affected by the influence that the driver's glasses lenses are exposed to the light to form light spots. Therefore, the eye movement feature parameter of the driver can be accurately extracted, and the drowsy driving detection of the driver can be performed according to the eye movement feature parameter, thereby avoiding the low accuracy of drowsy driving detection due to the wearing glasses of the driver.

In addition, different ID files are established to correspond to different drivers, and the ID files include the side face feature parameter of the driver and the normal eye movement feature parameter of the driver in the awake state, that is to say, for different drivers, the normal eye movement feature parameters used as a reference are different, so as to further solve the technical problem of low accuracy of drowsy driving detection due to individual differences.

Figure 2:
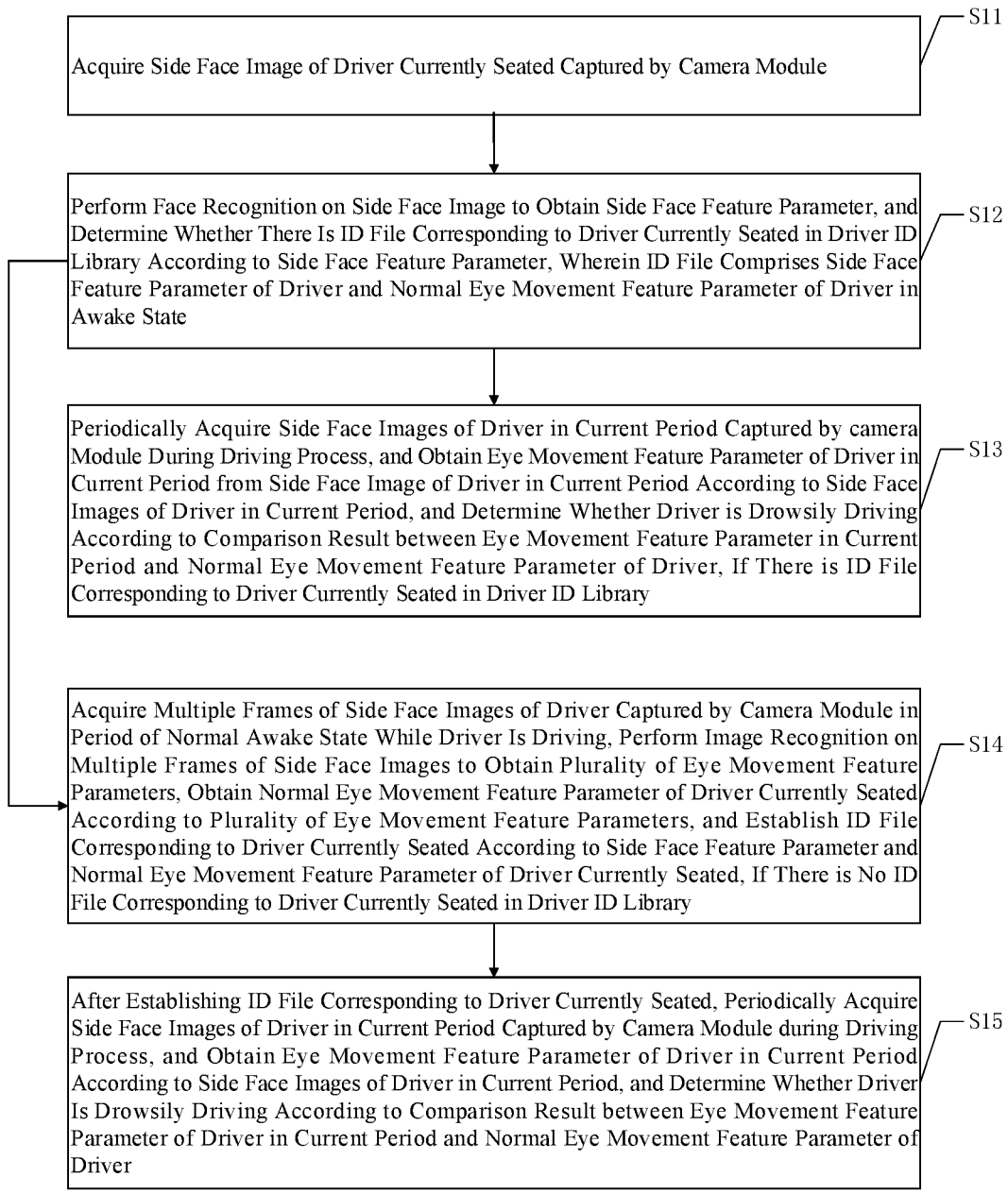
FIG. 2 illustrates a flowchart of the drowsy driving detection method according to another embodiment of the present disclosure.

In some embodiments, referring to FIG. 2, the method further includes steps S14-S15.

Step S14, if there is no ID file corresponding to the driver currently seated in the driver ID library, multiple frames of side face images of the driver captured by the camera module in a period of normal awake state when the driver is driving are acquired. an image recognition is performed on the multiple frames face images to obtain a plurality of eye movement feature parameters. The normal eye movement feature parameter of the driver currently seated is obtained according to the plurality of eye movement feature parameters, and an ID file corresponding to the driver currently seated is established according to the side face feature parameter of the driver currently seated and the normal eye movement feature parameters of the driver.

Specifically, in this step, if there is no ID file corresponding to the driver currently seated in the driver ID library, a new driver ID file is required to be established, so as to facilitate the drowsy driving detection of the driver during the subsequent driving process. The new driver ID file also includes the side face feature parameter and the normal eye movement feature parameter of the driver. The side face feature parameter is obtained in step S12, and a plurality of eye movement feature parameter samples may be obtained from the multiple frames of side face images in a period when the driver is in a normal awake state, that is, the normal eye movement feature parameter samples when the driver in the awake state. Therefore, based on the plurality of normal eye movement feature parameter samples, and the corresponding normal eye movement feature parameter of the driver may be obtained by training a preset model. A principle of training the preset model is: performing statistical analysis based on the plurality of normal eye movement feature parameter samples to obtain a range of the normal eye movement feature parameter.

A deep learning neural network is widely used in the model training and detection of drowsy driving, including a distance parameter between the upper and lower eyelids when the eyes are opened normally, a normal blink time parameter, and a parameter of percentage of normal eyelid closure over the pupil over time. The preset model in the embodiment may specifically use a deep learning neural network.

It can be understood that the obtained sample parameters are the distance parameter between the upper and lower eyelids, the blink time parameter, and the parameter of the percentage of eyelid closure over the pupil over time. These parameters have nothing to do with whether the image is a side face or a frontal face, and they represent numerical parameters. Therefore, during training, a training model of drowsy driving detection related technologies using frontal face images may also be used for training. It should be noted that the training of the eye movement feature parameter in the normal waking state is not the main idea of the method of this embodiment, and therefore, the training model or the training process will not be described in detail herein.

For example, generally speaking, the driver should be in a normal awake state in a first state when driving. Therefore, a period of normal awake state when the driver is driving may be after the vehicle runs for a preset time, such as 5 minutes. For another example, generally speaking, when the driver is driving in a normal awake state, the vehicle should be in a relatively stable driving stare. Therefore, after state information of the vehicle is acquired, whether the vehicle is in a stable driving state is determined according to the state information of the vehicle, so as to determine whether the driver is in a normal awake state. Of course, other technical means for determining whether the driver is in a normal awake state when driving may also be combined, which is not specifically limited in this embodiment, and should be understood as being within the protection scope of the present disclosure.

A step size of one period may be set according to specific technical requirements (for example, data processing time), which is not specifically limited in this embodiment.

Step S15, after establishing the ID file corresponding to the driver currently seated, during the driving process, the side face images of the driver in the current period captured by the camera module are periodically obtained, and the eye movement feature parameter of the driver in the current period is obtained according to the side face images in the current period. Whether the driver is drowsily driving is determined according to a comparison result between the eye movement feature parameter in the current period and the normal eye movement feature parameter of the driver.

In some embodiments, the eye movement feature parameter in the current period includes at least one of a distance parameter between upper and lower eyelids in the current period, a blink time parameter in the current period, and a parameter of percentage of eyelid closure over the pupil over time in the current period, and the normal eye movement feature parameters of the driver include at least one of a distance parameter between normal upper and lower eyelids, a normal blink time parameter, and a parameter of percentage of eyelid closure over the pupil over time.

It can be understood that the eye movement feature parameters in each period are extracted from the multiple frames of side face images in each period.

The distance parameter between the upper and lower eyelids is taken as an example. When the driver is drowsily driving, an opening of the eyes becomes smaller, that is, the eyes are commonly in a squinting state. Therefore, a distance parameter between the upper and lower eyelids in a current period may be statistically analyzed to obtain the distance parameter between the upper and lower eyelids, and the method of statistical analysis may be cluster analysis and averaging. It is set that when the distance parameter between the upper and lower eyelids obtained by the statistical analysis is not within a range of the normal eye movement feature parameter of the driver, it is determined that the driver is drowsily driving.

The blink time parameter is taken as an example, when the driver is drowsily driving, the driver may blink more frequently, that is, a blink time interval becomes shorter. Therefore, a blink frequency parameter may be obtained by statistical analysis of the distance parameter between the upper and lower eyelids in the current period. It is set that when the blink frequency parameter obtained by the statistical analysis is not within a range of the normal blink frequency parameter of the driver, or a current blink time interval parameter of the driver is not within a range of the normal blink time interval parameter of the driver, it is determined that the driver is drowsily driving.

The parameter of percentage of eyelid closure over the pupil over time is taken as an example, when the driver is drowsily driving, the driver may close his eyes for a long time, that is, enter a doze state. Therefore, the parameter of percentage of eyelid closure over the pupil over time in the current period may be obtained by statistical analysis of the eye closing time parameter and the eye opening time parameter in the current period. It is set that when the parameter of percentage of eyelid closure over the pupil over time of the driver in the current period is not within a range of a normal parameter of percentage of eyelid closure over the pupil over time of the driver, it is determined that the driver is drowsily driving.

It can be understood that one or more parameters of the distance parameter between the upper and lower eyelids, the blink time parameter, and the parameter of percentage of eyelid closure over the pupil over time may be selected as a basis for determining that the driver is drowsily driving, which is not specifically limited in this embodiment. It should be noted that there are only examples, and the drowsy driving detection may be specifically limited by combining eye state features showed by the driver in a drowsy state. These are settings that are made based on the inventive concept of the present embodiment combined with a face image recognition technology, and should be understood as all within the protection scope of the present disclosure, and therefore will not be repeated herein.

Figure 3:
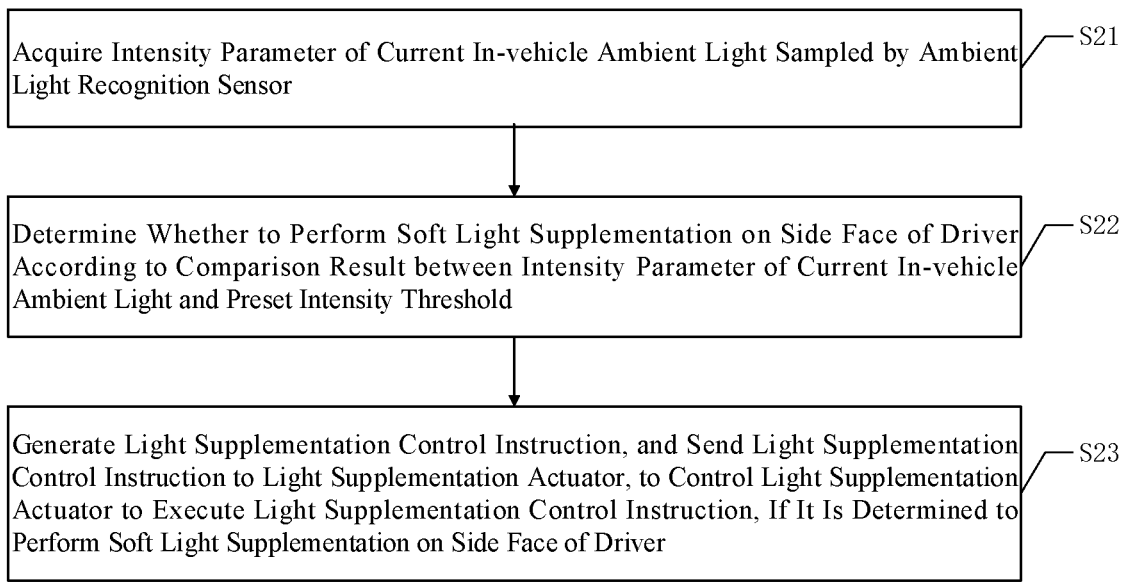
FIG. 3 illustrates a flowchart of performing a soft light supplementation according to an embodiment of the present disclosure.

In some embodiments, referring to FIG. 3, the method further includes steps S21-S23.

Step S21, an intensity parameter of current in-vehicle ambient light sampled by an ambient light recognition sensor is acquired.

Specifically, the ambient light recognition sensor may be arranged in an interior space of the vehicle.

Step S22, whether to perform a soft light supplementation on a side face of the driver is determined according to a comparison result between the intensity parameter of the current in-vehicle ambient light and a preset intensity threshold.

Specifically, in this embodiment, a CMOS camera component is used to capture a left side face of the driver. When the intensity parameter of the current in-vehicle ambient light does not satisfy a good imaging quality of the CMOS camera component, it is determined to perform the soft light supplementation on the side face of the driver, so as to provide a light gain for the CMOS camera component, thereby obtaining images with better imaging quality.

Step S23, if it is determined to perform the soft light supplementation on the side face of the driver, a light supplementation control instruction is generated, and is sent to the light supplementation actuator, so as to control the light supplementation actuator to execute the light supplementation control instruction.

Specifically, the light supplementation actuator is a light for soft light supplementation, which may be designed in a strip shape, and may be assembled on a left side of the driver seat on the vehicle body corresponding to the left side of the human head (located in an interior space of the vehicle). The light for soft light supplementation emits soft light of diffuse reflection, which is not dazzling, and plays a role of light supplementation for the left side face of the driver under the condition of poor light effect. On a premise of providing light supplementation, the soft light of diffuse reflection can prevent a dazzling interference to the driver.

More specifically, for example, when the intensity parameter of the current in-vehicle ambient light is less than a first preset intensity threshold and greater than a second preset intensity threshold, the light for soft light supplementation is controlled to light up with a first brightness. For another example, when the intensity parameter of the current in-vehicle ambient light is less than the second preset intensity threshold, the light for soft light supplementation is controlled to light up with a second brightness. The above are only illustrations. Those skilled in the art are well aware that this embodiment may be adjusted according to practical technical requirements, which is not specifically limited in this embodiment, and it should be understood that they are all within the protection scope of this embodiment.

Figure 4:
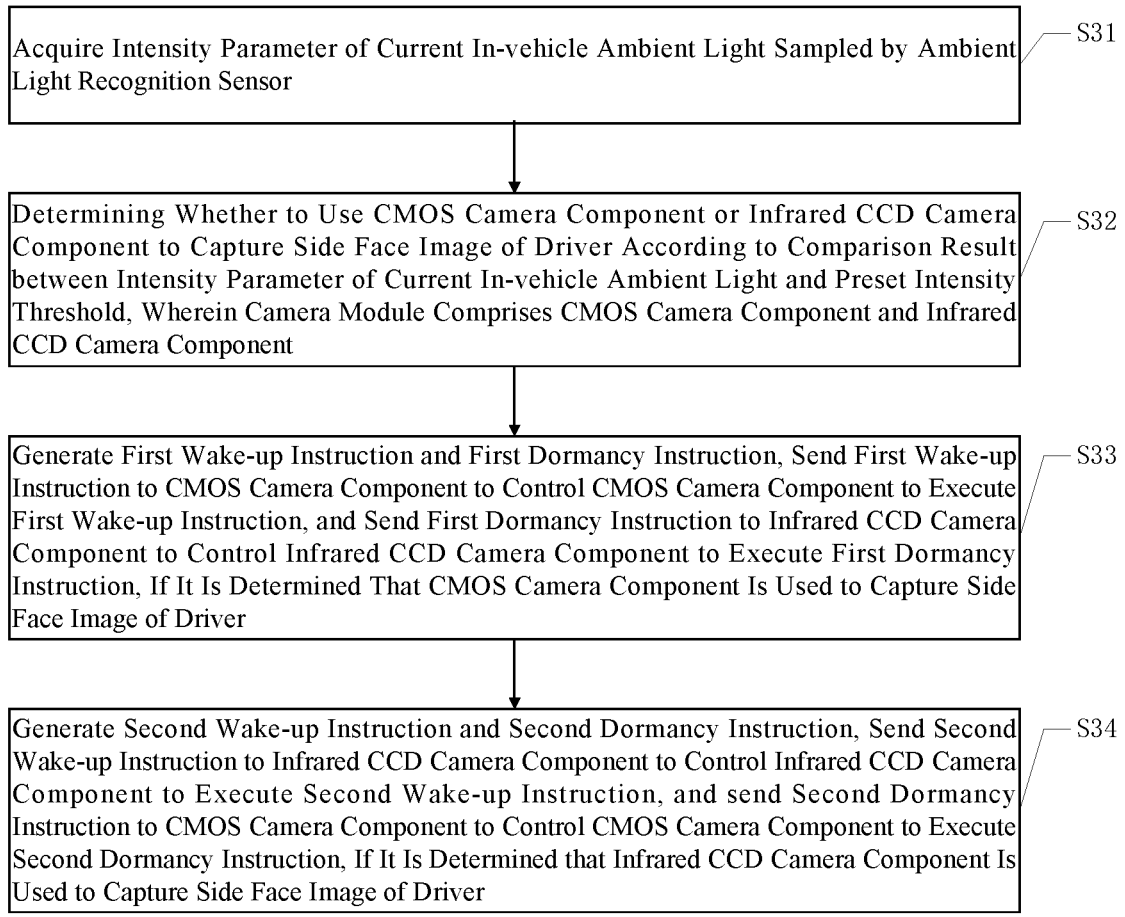
FIG. 4 illustrates a flowchart of controlling a camera component according to an embodiment of the present disclosure.

In some embodiments, referring to FIG. 4, the method further includes steps S31-S34.

Step S31, an intensity parameter of current in-vehicle ambient light sampled by an ambient light recognition sensor is acquired.

Specifically, the ambient light recognition sensor may be arranged in an interior space of the vehicle.

Step S32, whether to use a CMOS camera component or an infrared CCD camera component to capture the side face image of the driver according to a comparison result between the intensity parameter of the current in-vehicle ambient light and a preset intensity threshold. The camera module includes the CMOS camera component and the infrared CCD camera components.

Specifically, in this embodiment, the CMOS camera component or the infrared CCD camera component is used to capture the left side image of the driver.

When the intensity parameter of the current in-vehicle ambient light does not satisfy a requirement that the CMOS camera component has good imaging quality, it is determined that the infrared CCD camera component is used to capture the left side image of the driver to capture images with better imaging quality. In this circumstance, the CMOS camera component goes dormant.

When the intensity parameter of the current in-vehicle ambient light satisfies the requirement that the CMOS camera component has better imaging quality, it is determined that the CMOS camera component is used to capture the left side image of the driver to capture images with better imaging quality. In this circumstance, the infrared CCD camera component goes dormant.

Step S33, if it is determined that the CMOS camera component is used to capture the side face image of the driver, a first wake-up instruction and a first dormancy instruction are generated. The first wake-up instruction is sent to the CMOS camera component to control the CMOS camera component to execute the first wake-up instruction, and the first dormancy instruction is sent to the infrared CCD camera component, to control the infrared CCD camera component to execute the first dormancy instruction.

Step S34, if it is determined that the infrared CCD camera component is used to capture the side face image of the driver, a second wake-up instruction and a second dormancy instruction are generated. The second wake-up instruction is sent to the infrared CCD camera component to control the infrared CCD camera component to execute the second wake-up instruction, and the second dormancy instruction is sent to the CMOS camera component, to control the CMOS camera component to execute the second dormancy instruction.

It can be understood that the range of the preset intensity threshold corresponding to the better imaging quality of the CMOS camera component may be set according to specific technical requirements, which is related to a specific image quality required by the selected feature extraction method, and is not specifically limited in this embodiment. It should be understood that they all fall within the protection scope of this embodiment.

In some embodiments, the method further includes steps S41-S43.

Step S41, parameter information of a first plane where a camera optical axis of a camera module is located is acquired.

Step S42, an image recognition is performed on the profile image to obtain parameter information of a second plane where a side face profile of a driver is located;

Step S43, whether the first plane is perpendicular to the second plane is determined according to the parameter information of the first plane and the parameter information of the second plane. If the first plane is not perpendicular to the second plane, a lens adjustment control instruction is sent to a lens adjustment drive mechanism to control the lens adjustment drive mechanism to drive the camera module to move, so that the first plane where the camera optical axis of the camera module is located is perpendicular to the second plane where the side face profile of the driver is located.

Specifically, due to differences in the height and sitting habits of different drivers, the lens adjustment drive mechanism for adjusting a position of the camera module may be provided, to adjust the position of the camera module to make the camera module completely capture the side face image of the driver. For example, a drive motor is used as the drive element of the lens adjustment drive mechanism. In this embodiment, an angular displacement output by the drive motor may be controlled according to a relationship between the first plane where the camera optical axis of the camera module is located and the second plane where the side face profile of the driver is located, so that the plane where the camera optical axis is located is perpendicular to the second plane where the side face profile of the driver is located.

After a driver is seated, a side face image (left side face or right side face) of the driver is acquired, a face recognition is performed on the side face image to obtain a side face feature parameter, and whether there is an ID file corresponding to the driver currently seated in an ID library is determined according to the side face feature parameter. If there is an ID file corresponding to the driver currently seated in the driver ID library, during the driving process, side face images of the driver in the current period are periodically acquired, and an eye movement feature parameter of the driver in the current period is obtained according to the side face images in the current period, and finally whether the driver is drowsily driving is determined according to a comparison result between the eye movement feature parameter of the driver in the current period and the normal eye movement feature parameter of the driver recorded in the ID file. It can be understood that when the side face images of the driver are used as the judgment data for detecting the driver's drowsy driving, the side face images captured by the camera module will not be affected by an influence that the drive's glasses lens are facing to light to form light spots. Therefore, the eye movement feature parameter of the driver can be accurately extracted, and the driver's drowsy driving detection can be performed according to the eye movement feature parameter, thereby avoiding the low accuracy of the drowsy driving detection due to the wearing glasses of the driver. In addition, different ID files are established corresponding to different drivers, and the ID files include the side face feature parameter of the driver and the normal eye movement feature parameter of the driver in an awake state, that is to say, for different drivers, the normal eye movement feature parameter used as reference are different, thereby further solving the technical problem of low accuracy of drowsy driving detection due to individual differences.

Other features and advantages of the disclosure will be set forth in the description which follows, and partially, will be apparent from the description, or will be manifested by practice of the disclosure. The object and other advantages of the present disclosure may be realized and attained by the structure particularly pointed out in the description, claims and drawings.

Figure 5:
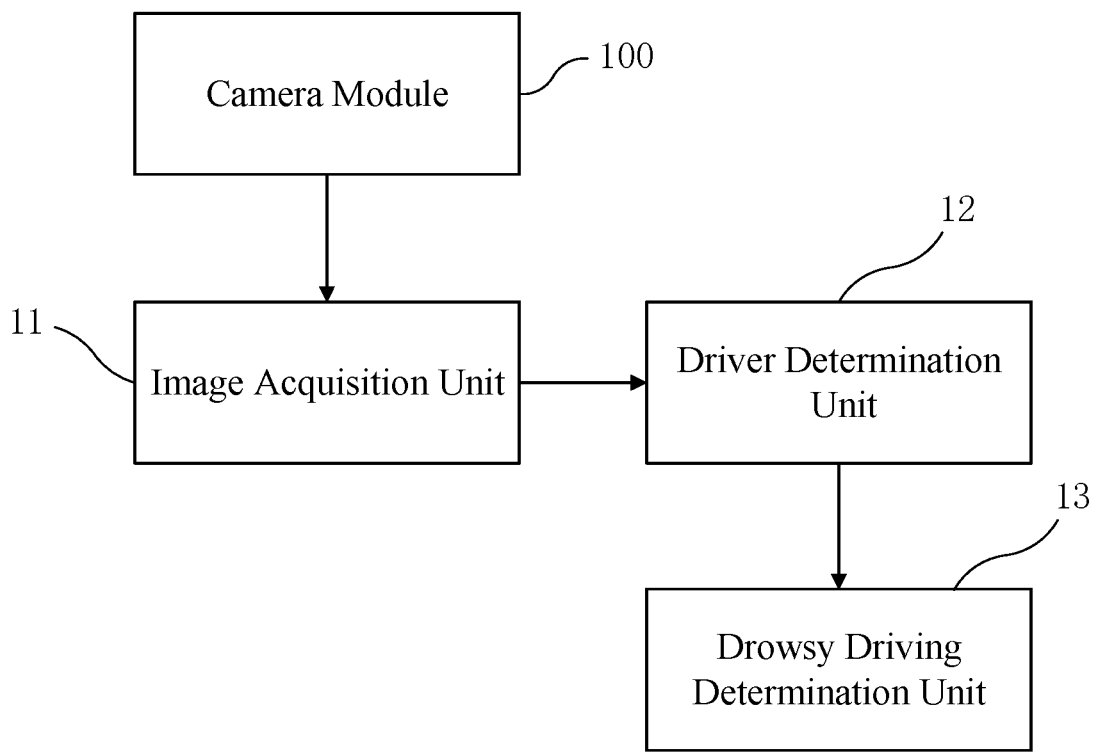
FIG. 5 illustrates a diagram of a framework of a drowsy driving detection system according to an embodiment of the present disclosure.

Another embodiment of the present disclosure proposes a drowsy driving detection system. Referring to FIG. 5, FIG. 5 illustrates a diagram of a framework of a drowsy driving detection system according to the embodiment, and the system in this embodiment includes:

an image acquisition unit 11, configured to acquire a side face image of a driver currently seated captured by a camera module 100;

a driver determination unit 12, configured to perform a face recognition on the side face image to obtain a side face feature parameter, and determine whether there is an ID file corresponding to the driver currently seated in a driver ID library according to the side face feature parameter, wherein the ID file includes the side face feature parameter of the driver and a normal eye movement feature parameter of the driver in an awake state; and a drowsy driving determination unit 13, configured to periodically acquire side face images of the driver in a current period captured by the camera module 100 during a driving process, obtain an eye movement feature parameter of the driver in the current period according to the side face images of the driver in the current period, and determine whether the driver is drowsily driving according to a comparison result between the eye movement feature parameter in the current period and the normal eye movement feature parameter of the driver, if there is an ID file corresponding to the driver currently seated in the driver ID library.

Figure 6:
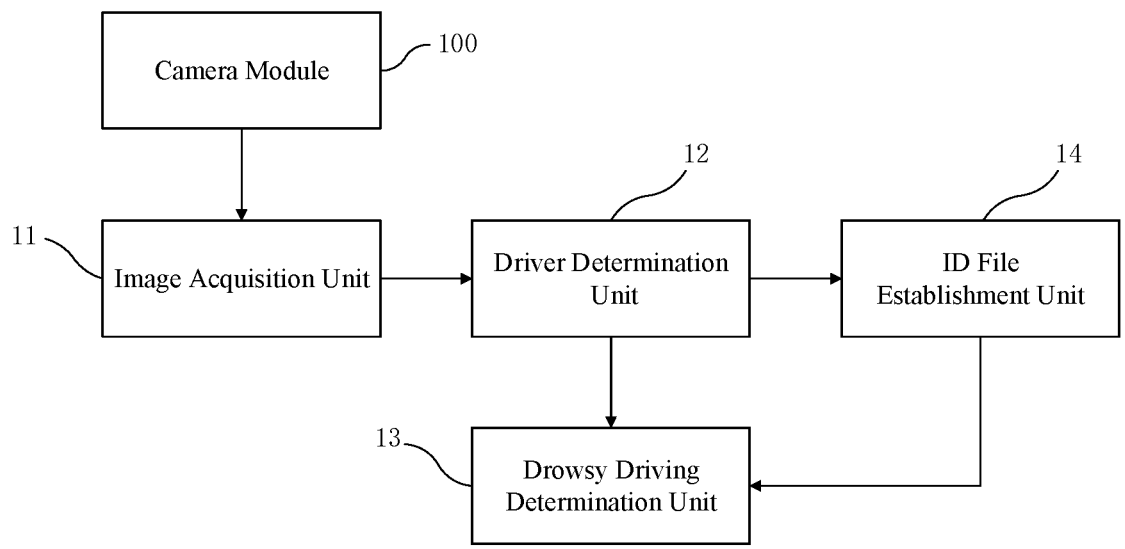
FIG. 6 illustrates a diagram of a framework of the drowsy driving detection system according to another embodiment of the present disclosure.

In some embodiments, referring to FIG. 6, the system further includes an ID file establishment unit 14, configured to acquire multiple frames of side face images captured by the camera module 100 in a period of normal awake state when the driver is driving, perform an image recognition on the multiple frames of side face images to obtain a plurality eye movement feature parameters, obtain a normal eye movement feature parameter of the driver currently seated according to the plurality of eye movement feature parameters, and establish an ID file corresponding to the driver currently seated according to the side face feature parameters of the driver currently seated and the normal eye movement feature parameters of the driver.

The drowsy driving determination unit 13 is further configured to periodically acquire the side face images of the driver in the current period captured by the camera module 100 during the driving process after establishing the ID file corresponding to the driver currently seated, obtain the eye movement feature parameters of the driver in the current period according to the side face images in the current period, and determine whether the driver is drowsily driving according to the comparison result of the eye movement feature parameters in the current period and the normal eye movement feature parameters of the driver.

In some embodiments, the ID file establishment unit 14 specifically includes:

a driver feature parameter acquisition unit, configured to acquire multiple frames of side face images of the driver currently seated in a period captured by the camera module 100, and perform an image recognition on the multiple frames of side face images to obtain a plurality of eye movement feature parameters;

a sample matching unit, configured to match the plurality of eye movement feature parameters with a plurality of individual drowsiness detection samples in an individual drowsiness detection sample library, and determine an individual drowsiness detection sample with the highest matching degree with the plurality of eye movement feature parameters in the individual drowsiness detection sample library;

a normal parameter acquisition unit, configured to acquire the normal eye movement feature parameter of the driver corresponding to the individual drowsiness detection sample with the highest matching degree, and taking it as the normal eye movement feature parameter of the driver currently seated; and a file generation unit, configured to generate an ID file corresponding to the driver currently seated according to the side face feature parameter of the driver currently seated and the normal eye movement feature parameter of the driver.

Figure 7:
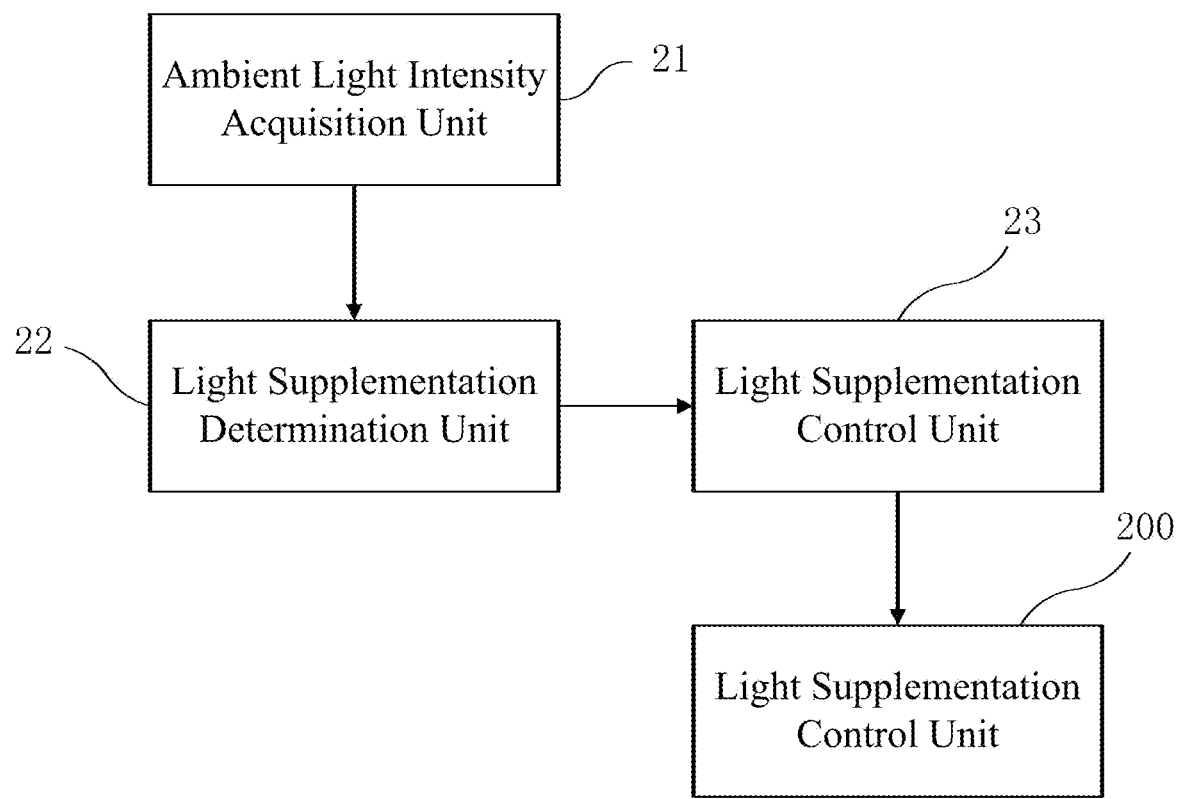
FIG. 7 illustrates a diagram of a framework of a soft light supplementation control module according to an embodiment of the present disclosure.

In some embodiments, the system further includes a soft light supplementation control module. Referring to FIG. 7, the soft light supplementation control module includes:

an ambient light intensity acquisition unit 21, configured to acquire an intensity parameter of current in-vehicle ambient light sampled by an ambient light recognition sensor;

a light supplementation determination unit 22, configured to determine whether to perform a soft light supplementation on the side face of the driver according to a comparison result between the intensity parameter of the current in-vehicle ambient light and a preset intensity threshold; and a light supplementation control unit 23, configured to generate a light supplementation control instruction if it is determined to perform the soft light supplementation on the side face of the driver, and send the light supplementation control instruction to a light supplementation actuator 200 to control the light supplementation executive mechanism 200 to execute the light supplementation control instruction.

Figure 8:
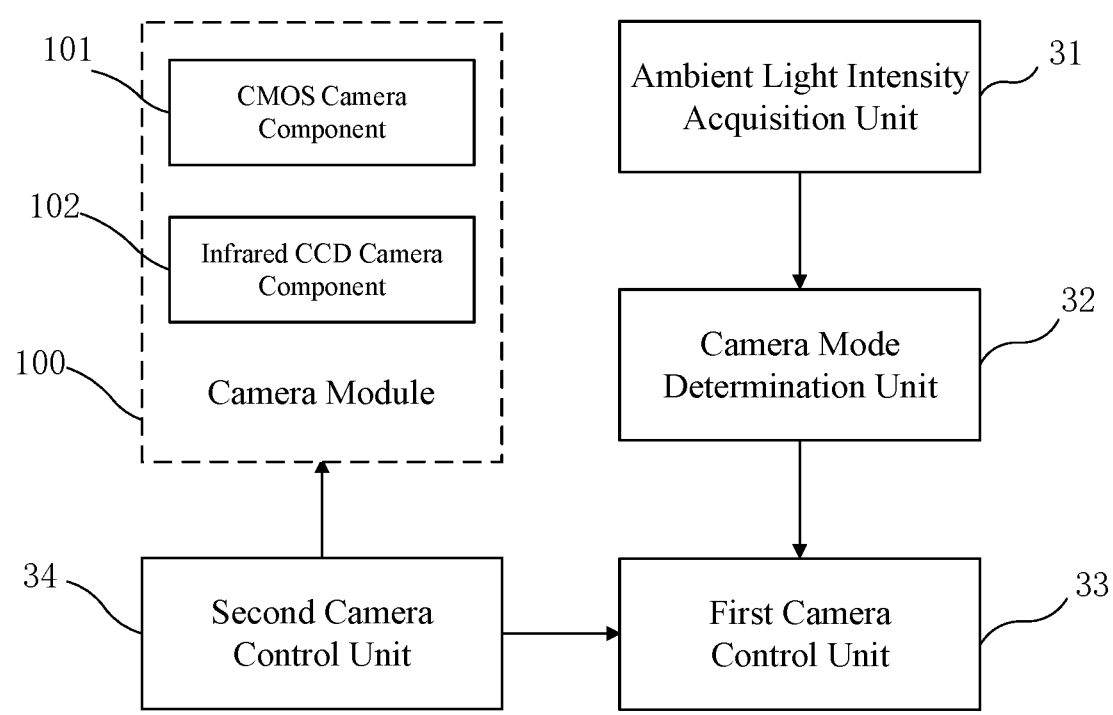
FIG. 8 illustrates a diagram of a framework of a camera component control module according to an embodiment of the present disclosure.

In some embodiments, the system further includes a camera component control module. Referring to FIG. 8, the camera component control module includes:

an ambient light intensity acquisition unit 31, configured to acquire an intensity parameter of the current in-vehicle ambient light sample by the ambient light recognition sensor;

a camera mode determination unit 32, configured to determine whether to use a CMOS camera component 101 or an infrared CCD camera component 102 to capture the side face image of the driver according to a comparison result between an intensity parameter of the current in-vehicle ambient light and a preset intensity threshold, wherein the camera module 100 includes the CMOS camera component 101 and the infrared CCD camera component 102;

a first camera control unit 33, configured to generate a first wake-up instruction and a first dormancy instruction if it is determined to use the CMOS camera component 101 to capture the side face image of the driver, send the first wake-up instruction to the CMOS camera component 101 to control the CMOS camera component 101 to execute the first wake-up instruction, and send the first dormancy instruction to the infrared CCD camera component 102, to control the infrared CCD camera component 102 to execute the first dormancy instruction; and a second camera control unit 34, configured to generate a second wake-up instruction and a second dormancy instruction when it is determined to use the infrared CCD camera component 102 to capture the side face image of the driver, send the second wake-up instruction to the infrared CCD camera component 102 to control the infrared CCD camera component 102 to execute the second wake-up instruction, and send the second dormancy instruction to the CMOS camera component 101 to control the CMOS camera component 101 to execute the second dormancy instruction.

In some embodiments, the system further includes:

a first plane information acquisition unit, configured to acquire parameter information of a first plane where a camera optical axis of a camera module is located;

a second plane information acquisition unit, configured to perform an image recognition on the side face image to obtain parameter information of a second plane where a side face profile of the driver is located; and a lens adjustment control unit, configured to determine whether the first plane is perpendicular to the second plane according to the parameter information of the first plane and the parameter information of the second plane, and send the lens adjustment control instruction to the lens adjustment drive mechanism to control the lens adjustment drive mechanism to drive the camera module to move if the first plane is not perpendicular to the second plane, so that the first plane where the camera optical axis of the camera module is located is perpendicular to the second plane where the side face profile of the driver is located.

The system described in the foregoing embodiments is only illustrative, in which the units described as separate components may or may not be physically separated, and the components displayed as units may or may not be physical units, that is, they may be located in one place, or distributed over multiple network elements. Some or all of the modules may be selected according to practice needs to achieve a purpose of the solution in this embodiment.

It should be noted that the system described in the foregoing embodiment corresponds to the method described in the foregoing embodiment. Therefore, the undescribed part of the system described in the foregoing embodiment may be obtained by referring to the content of the method described in the foregoing embodiment, which will not be repeated herein.

Moreover, if the drowsy driving detection system described in the above embodiments is implemented in a form of a software functional unit and sold or used as an independent product, it may be stored in a computer-readable storage medium.

Another embodiment of the present disclosure further provides a computer device, including: a drowsy driving detection system according to the above embodiment; or, a memory and a processor. The memory stores computer-readable instructions, and when the computer-readable instructions are executed by the processor, the processor executes steps of the drowsy driving detection method according to the above-mentioned embodiment.

Of course, the computer device may further have components such as a wired or wireless network interface, a keyboard, and an input-output interface, so as to perform input and output. The computer device may further include other components for realizing device functions, which will not be repeated herein.

Exemplarily, the computer program may be divided into one or more units, which are stored in the memory and executed by the processor to accomplish the present disclosure. The one or more units may be a series of computer program instruction segments capable of performing specific functions, and the instruction segments are configured to describe an execution process of the computer program in the computer device.

The processor may be a Central Processing Unit (CPU), other general-purpose processor, a Digital Signal Processor (DSP), an Application Specific Integrated Circuit (ASIC), an Field-Programmable Gate Array (FPGA) or other programmable logic devices, a discrete gate, a transistor logic devices, a discrete hardware component, and the like. The general-purpose processor may be a microprocessor or any conventional processor. The processor is a control center of the computer device, which is connected to all parts of the computer device through various interfaces and lines.

The memory may be configured to store computers program and/or units, and the processor implements various functions of the computer device by running or executing computer programs and/or units stored in the memory, and calling data stored in the memory. In addition, the memory may be a high-speed random access memory, and may also be a non-volatile memory such as hard disk, internal memory, plug-in hard disk, Smart Media Card (SMC), Secure Digital (SD) card, Flash Card, at least one magnetic disk storage device, flash memory device, or other volatile solid-state storage device.

Another embodiment of the present disclosure further provides a computer-readable storage medium, on which a computer program is stored. When the computer program is executed by a processor, steps of the drowsy driving detection method described in the foregoing embodiment are implemented.

Specifically, the computer-readable storage medium may include: any entity or device capable of carrying computer program codes, a recording medium, a U disk, a removable hard disk, a magnetic disk, an optical disk, a computer memory, a Read-Only Memory (ROM), a Random Access Memory (RAM), an electric carrier signal, a telecommunication signal and a software distribution medium.

Various embodiments of the present disclosure have been described above, and the foregoing descriptions are exemplary, rather than exhaustive, which are not limited to the disclosed embodiments. Numerous modifications and variations are apparent to those of ordinary skill in the art without departing from the scope and spirit of the described embodiments. The terms used in the present disclosure are chosen to best explain the principles of the various embodiments, practical application or technical improvement in the marketplace, or to enable others of ordinary skill in the art to understand the various embodiments disclosed herein.

What is claimed is:

1. A drowsy driving detection method, comprising:
   acquiring a side face image of a driver currently seated captured by a camera module, wherein the side face image is a left side face image or a right side face image of the driver, wherein the left or right side face image is captured by the camera module from a left or a right side of a head of the driver;
   performing a face recognition on the side face image to obtain a side face feature parameter, and determining whether there is an ID file corresponding to the driver currently seated in a driver ID library according to the side face feature parameter, wherein the ID file comprises a side face feature parameter of the driver and a normal eye movement feature parameter of the driver in an awake state; and periodically acquiring side face images of the driver in a current period captured by the camera module during a driving process, obtaining an eye movement feature parameter of the driver in the current period according to the side face images of the driver in the current period, and determining whether the driver is drowsily driving according to a comparison result between the eye movement feature parameter in the current period and the normal eye movement feature parameter of the driver, if there is an ID file corresponding to the driver currently seated in the driver ID library;

wherein the eye movement feature parameter in the current period comprises at least one of a distance parameter between upper and lower eyelids in the current period, a blink time parameter in the current period, and a parameter of percentage of eyelid closure over the pupil over time in the current period, and the normal eye movement feature parameter of the driver comprises at least one of a distance parameter between normal upper and lower eyelids, a normal blink time parameter, and a parameter of percentage of normal eyelid closure over the pupil over time.

2. The drowsy driving detection method of claim 1, further comprising:

acquiring multiple frames of side face images of the driver captured by the camera module in a period of normal awake state while the driver is driving, performing an image recognition on the multiple frames of side face images to obtain a plurality of eye movement feature parameters, obtaining a normal eye movement feature parameter of the driver currently seated according to the plurality of eye movement feature parameters, and establishing an ID file corresponding to the driver currently seated according to the side face feature parameter and the normal eye movement feature parameter of the driver currently seated, if there is no ID file corresponding to the driver currently seated in the driver ID library; and after establishing the ID file corresponding to the driver currently seated, periodically acquiring the side face images of the driver in current period captured by the camera module during the driving process, and obtaining the eye movement feature parameter of the driver in the current period according to the side face images of the driver in the current period, and determining whether the driver is drowsily driving according to the comparison result between the eye movement feature parameter of the driver in the current period and the normal eye movement feature parameter of the driver.

3. The drowsy driving detection method of claim 1, further comprising:

acquiring an intensity parameter of current in-vehicle ambient light sampled by an ambient light recognition sensor;

determining whether to perform a soft light supplementation on a side face of the driver according to a comparison result between the intensity parameter of the current in-vehicle ambient light and a preset intensity threshold; and generating a light supplementation control instruction, and sending the light supplementation control instruction to a light supplementation actuator, to control the light supplementation actuator to execute the light supplementation control instruction, if it is determined to perform the soft light supplementation on the side face of the driver.

4. The drowsy driving detection method of claim 1, further comprising:

acquiring an intensity parameter of a current in-vehicle ambient light captured by an ambient light recognition sensor;

determining whether to use a CMOS camera component or an infrared CCD camera component to capture the side face image of the driver according to a comparison result between the intensity parameter of the current in-vehicle ambient light and a preset intensity threshold, wherein the camera module comprises the CMOS camera component and the infrared CCD camera component;

generating a first wake-up instruction and a first dormancy instruction, sending the first wake-up instruction to the CMOS camera component to control the CMOS camera component to execute the first wake-up instruction, and sending the first dormancy instruction to the infrared CCD camera component to control the infrared CCD camera component to execute the first dormancy instruction, if it is determined that the CMOS camera component is used to capture the side face image of the driver; and generating a second wake-up instruction and a second dormancy instruction, sending the second wake-up instruction to the infrared CCD camera component to control the infrared CCD camera component to execute the first wake-up instruction, and sending the second dormancy instruction to the CMOS camera component to control the CMOS camera component to execute the second dormancy instruction, if it is determined that the infrared CCD camera component is used to capture the side face image of the driver.

5. The drowsy driving detection method of claim 1, further comprising:

acquiring a parameter information of a first plane where a camera optical axis of the camera module is located;

performing an image recognition on the side face image to obtain a parameter information of a second plane where a side face of the driver is located; and determining whether the first plane is perpendicular to the second plane according to the parameter information of the first plane and the parameter information of the second plane;

and generating a lens adjustment control instruction, and sending the lens adjustment control instruction to a lens adjustment drive mechanism, to control the lens adjustment drive mechanism to drive the camera module to move, if the first plane is not perpendicular to the second plane, so that the first plane where the camera optical axis of the camera module is located is perpendicular to the second plane where the side face of the driver is located.

6. A drowsy driving detection system, comprising:
a processor; and
a memory for storing computer-readable instructions executable by the processor;
wherein the processor is configured to perform a drowsy driving detection method, the method comprising:

acquiring a side face image of a driver currently seated captured by a camera module, wherein the side face image is a left side face image or a right side face image of the driver, wherein the left or right side face image is captured by the camera module from a left or a right side of a head of the driver;

performing a face recognition on the side face image to obtain a side face feature parameter, and determining whether there is an ID file corresponding to the driver currently seated in a driver ID library according to the side face feature parameter, wherein the ID file comprises a side face feature parameter of the driver and a normal eye movement feature parameter of the driver in an awake state; and periodically acquiring side face images of the driver in a current period captured by the camera module during a driving process, obtaining an eye movement feature parameter of the driver in the current period according to the side face images of the driver in the current period, and determining whether the driver is drowsily driving according to a comparison result between the eye movement feature parameter in the current period and the normal eye movement feature parameter of the driver, if there is an ID file corresponding to the driver currently seated in the driver ID library;

wherein the eye movement feature parameter in the current period comprises at least one of a distance parameter between upper and lower eyelids in the current period, a blink time parameter in the current period, and a parameter of percentage of eyelid closure over the pupil over time in the current period, and the normal eye movement feature parameter of the driver comprises at least one of a distance parameter between normal upper and lower eyelids, a normal blink time parameter, and a parameter of percentage of normal eyelid closure over the pupil over time.

7. The drowsy driving detection system of claim 6, the method further comprising:

acquiring multiple frames of side face images of the driver captured by the camera module in a period of normal awake state while the driver is driving, performing an image recognition on the multiple frames of side face images to obtain a plurality of eye movement feature parameters, obtaining a normal eye movement feature parameter of the driver currently seated according to the plurality of eye movement feature parameters, and establishing an ID file corresponding to the driver currently seated according to the side face feature parameter and the normal eye movement feature parameter of the driver currently seated, if there is no ID file corresponding to the driver currently seated in the driver ID library; and after establishing the ID file corresponding to the driver currently seated, periodically acquiring the side face images of the driver in current period captured by the camera module during the driving process, and obtaining the eye movement feature parameter of the driver in the current period according to the side face images of the driver in the current period, and determining whether the driver is drowsily driving according to the comparison result between the eye movement feature parameter of the driver in the current period and the normal eye movement feature parameter of the driver.

8. The drowsy driving detection system of claim 6, the method further comprising:

acquiring an intensity parameter of current in-vehicle ambient light sampled by an ambient light recognition sensor;

determining whether to perform a soft light supplementation on a side face of the driver according to a comparison result between the intensity parameter of the current in-vehicle ambient light and a preset intensity threshold; and generating a light supplementation control instruction, and sending the light supplementation control instruction to a light supplementation actuator, to control the light supplementation actuator to execute the light supplementation control instruction, if it is determined to perform the soft light supplementation on the side face of the driver.

9. The drowsy driving detection system of claim 6, the method further comprising:

acquiring an intensity parameter of a current in-vehicle ambient light captured by an ambient light recognition sensor;

determining whether to use a CMOS camera component or an infrared CCD camera component to capture the side face image of the driver according to a comparison result between the intensity parameter of the current in-vehicle ambient light and a preset intensity threshold, wherein the camera module comprises the CMOS camera component and the infrared CCD camera component;

generating a first wake-up instruction and a first dormancy instruction, sending the first wake-up instruction to the CMOS camera component to control the CMOS camera component to execute the first wake-up instruction, and sending the first dormancy instruction to the infrared CCD camera component to control the infrared CCD camera component to execute the first dormancy instruction, if it is determined that the CMOS camera component is used to capture the side face image of the driver; and generating a second wake-up instruction and a second dormancy instruction, sending the second wake-up instruction to the infrared CCD camera component to control the infrared CCD camera component to execute the second wake-up instruction, and sending the second dormancy instruction to the CMOS camera component to control the CMOS camera component to execute the second dormancy instruction, if it is determined that the infrared CCD camera component is used to capture the side face image of the driver.

10. The drowsy driving detection system of claim 6, the method further comprising:

acquiring a parameter information of a first plane where a camera optical axis of the camera module is located;

performing an image recognition on the side face image to obtain a parameter information of a second plane where a side face of the driver is located; and determining whether the first plane is perpendicular to the second plane according to the parameter information of the first plane and the parameter information of the second plane; and generating a lens adjustment control instruction, and sending the lens adjustment control instruction to a lens adjustment drive mechanism, to control the lens adjustment drive mechanism to drive the camera module to move, if the first plane is not perpendicular to the second plane, so that the first plane where the camera optical axis of the camera module is located is perpendicular to the second plane where the side face of the driver is located.

11. A computer device, comprising: a memory and a processor, wherein computer-readable instructions are stored in the memory, and when the computer-readable instructions are executed by the processor, the processor executes steps of the drowsy driving detection method, the method comprising:
- acquiring a side face image of a driver currently seated captured by a camera module, wherein the side face image is a left side face image or a right side face image of the driver, wherein the left or right side face image is captured by the camera module from a left or a right side of a head of the driver;
- performing a face recognition on the side face image to obtain a side face feature parameter, and determining whether there is an ID file corresponding to the driver currently seated in a driver ID library according to the side face feature parameter, wherein the ID file comprises a side face feature parameter of the driver and a normal eye movement feature parameter of the driver in an awake state; and
- periodically acquiring side face images of the driver in a current period captured by the camera module during a driving process, obtaining an eye movement feature parameter of the driver in the current period according to the side face images of the driver in the current period, and determining whether the driver is drowsily driving according to a comparison result between the eye movement feature parameter in the current period and the normal eye movement feature parameter of the driver, if there is an ID file corresponding to the driver currently seated in the driver ID library;
- wherein the eye movement feature parameter in the current period comprises at least one of a distance parameter between upper and lower eyelids in the current period, a blink time parameter in the current period, and a parameter of percentage of eyelid closure over the pupil over time in the current period, and the normal eye movement feature parameter of the driver comprises at least one of a distance parameter between normal upper and lower eyelids, a normal blink time parameter, and a parameter of percentage of normal eyelid closure over the pupil over time.

12. The computer device of claim 11, the method further comprising:
- acquiring multiple frames of side face images of the driver captured by the camera module in a period of normal awake state while the driver is driving, performing an image recognition on the multiple frames of side face images to obtain a plurality of eye movement feature parameters, obtaining a normal eye movement feature parameter of the driver currently seated according to the plurality of eye movement feature parameters, and
- establishing an ID file corresponding to the driver currently seated according to the side face feature parameter and the normal eye movement feature parameter of the driver currently seated, if there is no ID file corresponding to the driver currently seated in the driver ID library; and
- after establishing the ID file corresponding to the driver currently seated, periodically acquiring the side face images of the driver in current period captured by the camera module during the driving process, and obtaining the eye movement feature parameter of the driver in the current period according to the side face images of the driver in the current period, and
- determining whether the driver is drowsily driving according to the comparison result between the eye movement feature parameter of the driver in the current period and the normal eye movement feature parameter of the driver.

13. The computer device of claim 11, the method further comprising:
- acquiring an intensity parameter of current in-vehicle ambient light sampled by an ambient light recognition sensor;
- determining whether to perform a soft light supplementation on a side face of the driver according to a comparison result between the intensity parameter of the current in-vehicle ambient light and a preset intensity threshold; and
- generating a light supplementation control instruction, and sending the light supplementation control instruction to a light supplementation actuator, to control the light supplementation actuator to execute the light supplementation control instruction, if it is determined to perform the soft light supplementation on the side face of the driver.

14. The computer device of claim 11, the method further comprising:
- acquiring an intensity parameter of a current in-vehicle ambient light captured by an ambient light recognition sensor;
- determining whether to use a CMOS camera component or an infrared CCD camera component to capture the side face image of the driver according to a comparison result between the intensity parameter of the current in-vehicle ambient light and a preset intensity threshold, wherein the camera module comprises the CMOS camera component and the infrared CCD camera component;
- generating a first wake-up instruction and a first dormancy instruction, sending the first wake-up instruction to the CMOS camera component to control the CMOS camera component to execute the first wake-up instruction, and sending the first dormancy instruction to the infrared CCD camera component to control the infrared CCD camera component to execute the first dormancy instruction, if it is determined that the CMOS camera component is used to capture the side face image of the driver; and
- generating a second wake-up instruction and a second dormancy instruction, sending the second wake-up instruction to the infrared CCD camera component to control the infrared CCD camera component to execute the second wake-up instruction, and sending the second dormancy instruction to the CMOS camera component to control the CMOS camera component to execute the second dormancy instruction, if it is determined that the infrared CCD camera component is used to capture the side face image of the driver.

15. The computer device of claim 11, the method further comprising:
- acquiring a parameter information of a first plane where a camera optical axis of the camera module is located;
- performing an image recognition on the side face image to obtain a parameter information of a second plane where a side face of the driver is located; and
- determining whether the first plane is perpendicular to the second plane according to the parameter information of the first plane and the parameter information of the second plane; and generating a lens adjustment control instruction, and sending the lens adjustment control instruction to a lens adjustment drive mechanism, to control the lens adjustment drive mechanism to drive the camera module to move, if the first plane is not perpendicular to the second plane, so that the first plane where the camera optical axis of the camera module is located is perpendicular to the second plane where the side face of the driver is located.

* * * * *